United States Patent
Mukherjee

(10) Patent No.: US 9,952,979 B1
(45) Date of Patent: Apr. 24, 2018

(54) METHODS AND SYSTEMS FOR DIRECT MEMORY ACCESS OPERATIONS

(71) Applicant: QLOGIC, Corporation, Aliso Viejo, CA (US)

(72) Inventor: Abhishek Mukherjee, Pune (IN)

(73) Assignee: Cavium, Inc., San Jose, CA (US)

( * ) Notice: Subject to any disclaimer, the term of this patent is extended or adjusted under 35 U.S.C. 154(b) by 24 days.

(21) Appl. No.: 14/597,030

(22) Filed: Jan. 14, 2015

(51) Int. Cl.
| G06F 3/00 | (2006.01) |
| G06F 13/28 | (2006.01) |
| G06F 13/00 | (2006.01) |
| G06F 5/00 | (2006.01) |
| G06F 13/36 | (2006.01) |
| G06F 15/167 | (2006.01) |
| G06F 12/1081 | (2016.01) |

(52) U.S. Cl.
CPC .......... *G06F 12/1081* (2013.01); *G06F 13/28* (2013.01); *G06F 2212/303* (2013.01); *G06F 2213/2806* (2013.01)

(58) Field of Classification Search
CPC .............................. G06F 12/1081; G06F 13/28
USPC .................... 710/22, 100, 300, 308; 709/212
See application file for complete search history.

(56) References Cited

U.S. PATENT DOCUMENTS

| 5,968,143 | A * | 10/1999 | Chisholm | G06F 13/126 |
| | | | | 710/23 |
| 7,610,431 | B1 * | 10/2009 | Watkins | G06F 13/4022 |
| | | | | 710/100 |
| 8,103,809 | B1 * | 1/2012 | Michels | G06F 15/167 |
| | | | | 710/22 |
| 9,317,444 | B2 * | 4/2016 | Davda | G06F 13/28 |
| 9,483,290 | B1 * | 11/2016 | Mantri | H04L 67/1097 |
| 2001/0052038 | A1 * | 12/2001 | Fallon | G06F 3/0613 |
| | | | | 710/68 |
| 2006/0190644 | A1 * | 8/2006 | Fallon | G06F 3/0613 |
| | | | | 710/68 |
| 2006/0242332 | A1 * | 10/2006 | Johnsen | G06F 13/28 |
| | | | | 710/22 |
| 2007/0214308 | A1 * | 9/2007 | Pope | G06F 9/544 |
| | | | | 711/100 |
| 2008/0256266 | A1 * | 10/2008 | Okitsu | G06F 13/102 |
| | | | | 710/26 |
| 2009/0327645 | A1 * | 12/2009 | Doi | G06F 12/1081 |
| | | | | 711/206 |
| 2010/0011136 | A1 * | 1/2010 | Go | G06F 13/28 |
| | | | | 710/22 |
| 2010/0318711 | A1 * | 12/2010 | Weber | G06F 13/28 |
| | | | | 710/308 |

(Continued)

*Primary Examiner* — Farley Abad
*Assistant Examiner* — Henry W Yu
(74) *Attorney, Agent, or Firm* — Klein, O'Neill & Singh LLP

(57) ABSTRACT

Systems and methods for a direct memory access (DMA) operation are provided. The method includes receiving a host memory address by a device coupled to a computing device; storing the host memory address at a device memory by a DMA engine; receiving a packet at the device for the computing device; instructing the DMA engine by a device processor to retrieve the host memory address from the device memory; retrieving the host memory address by the DMA engine without the device processor reading the host memory address; and transferring the packet to the computing device by a DMA operation.

17 Claims, 3 Drawing Sheets

(56) References Cited

U.S. PATENT DOCUMENTS

| | | | |
|---|---|---|---|
| 2012/0072906 A1* | 3/2012 | Tsirkin | G06F 12/1009 718/1 |
| 2012/0136958 A1* | 5/2012 | Zhu | H04L 69/22 709/212 |
| 2014/0095753 A1* | 4/2014 | Crupnicoff | G06F 13/28 710/300 |
| 2014/0201305 A1* | 7/2014 | Dalal | H04L 47/193 709/212 |
| 2015/0169487 A1* | 6/2015 | Subramaniyan | G06F 13/4022 710/5 |
| 2015/0281126 A1* | 10/2015 | Regula | G06F 13/4022 709/212 |

* cited by examiner

METHODS AND SYSTEMS FOR DIRECT MEMORY ACCESS OPERATIONS

TECHNICAL FIELD

The present invention relates to computing systems in general and more particularly to direct memory access operations.

BACKGROUND

Computing systems are commonly used today. A computing system often communicates with a peripheral device for performing certain functions, for example, reading and writing information. Direct memory access (DMA) is a feature that enables a hardware subsystem within a computer system to access the computer system memory (often referred to as host memory) independently of a system processor. This allows the computing hardware subsystem to perform other tasks while a DMA engine completes a data transfer, making DMA engines especially useful in input/output (I/O) applications. Common hardware subsystems using DMA engines include graphics cards, sound cards, network cards, and disk drive controllers. DMA engines can also be used for "memory to memory" copying or moving data within memory. Continuous efforts are being made to improve DMA operations.

BRIEF DESCRIPTION OF THE DRAWINGS

The various embodiments relating to facilitating communication between devices in a network now will be discussed in detail with an emphasis on highlighting the advantageous features. These novel and non-obvious embodiments are shown in the accompanying drawings, which are for illustrative purposes only. These drawings include the following figures, in which like numerals indicate like parts.

DETAILED DESCRIPTION

Figure 1A:
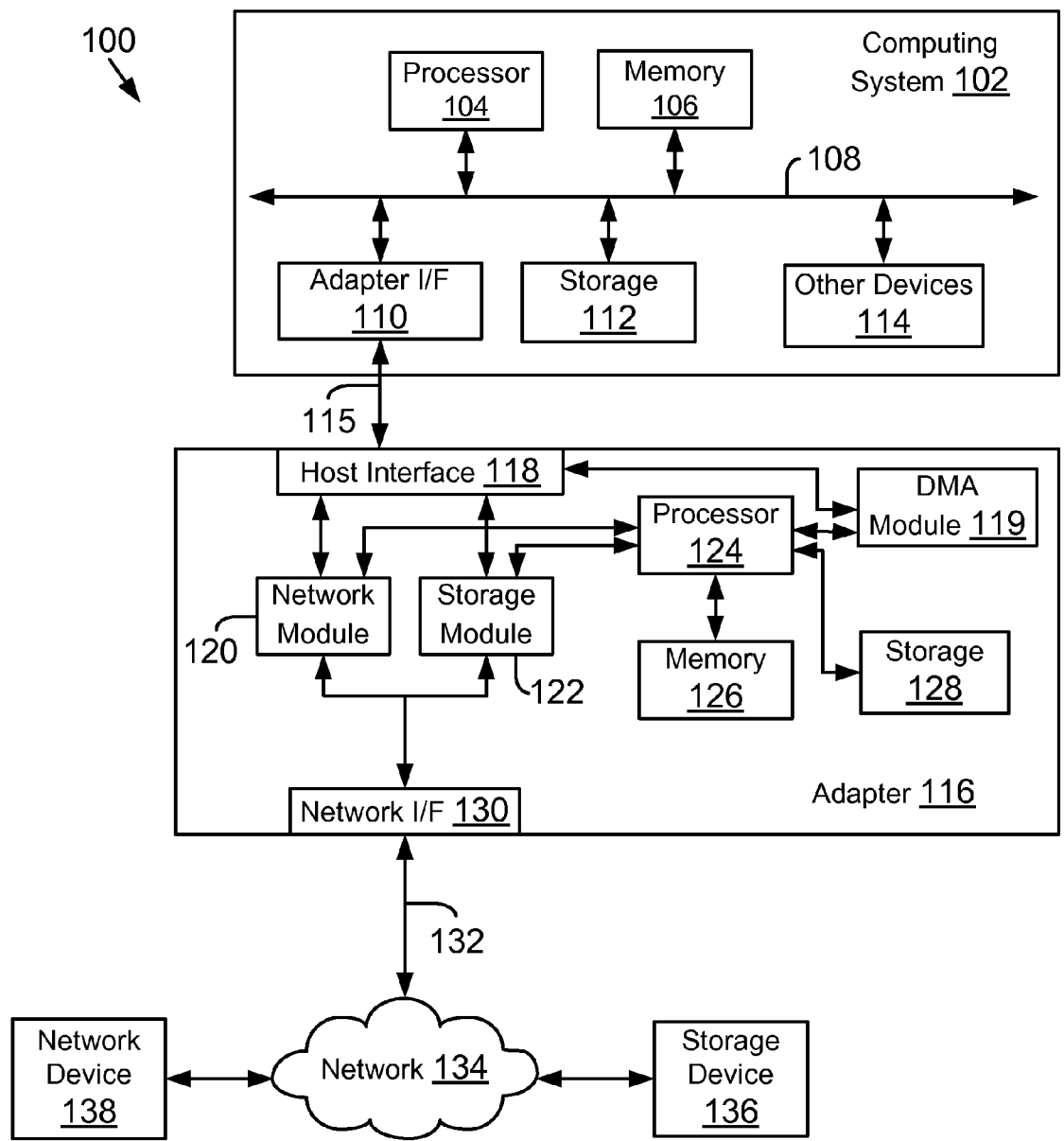
FIG. 1A is a functional block diagram of a computing system coupled to a network through an adapter.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic", "module", "component", "system", and "functionality", as used herein, generally represent software, firmware, hardware, or a combination of these elements. For instance, in the case of a software implementation, the terms "logic", "module", "component", "system", and "functionality" represent program code that performs specified tasks when executed on a hardware processing device or devices (e.g., CPU or CPUs). The program code can be stored in one or more non-transitory computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory storage medium for retaining information in any form, including various kinds of storage devices (magnetic, optical, static, etc.).

The embodiments disclosed herein, may be implemented as a computer process (method), a computing system, or as an article of manufacture, such as a computer program product or computer-readable media. The computer program product may be non-transitory computer storage media, readable by a computer device, and encoding a computer program of instructions for executing a computer process.

In one embodiment, systems and methods for a direct memory access (DMA) operation are provided. For example, the method includes receiving a host memory address by a device coupled to a computing device; storing the host memory address at a device memory by a DMA engine; receiving a packet at the device for the computing device; instructing the DMA engine by a device processor to retrieve the host memory address from the device memory; retrieving the host memory address by the DMA engine without the device processor reading the host memory address; and transferring the packet to the computing device by a DMA operation.

System:

FIG. 1A is a block diagram of a system 100 configured for use with the present embodiments. The system 100 may include one or more computing system 102 (may also be referred to as "host system 102") coupled to another device via a link 115, for example, an adapter 116 that interfaces with a network 134 via network link 132. The network 134 may be the Internet, a local area network, a wide area network, a metropolitan area network and others. The network 134 may include, for example, additional computing systems, servers, storage systems, etc. It is noteworthy that although the description below is based on the interaction between adapter 116 and host system 102, the embodiments disclosed herein are not limited to any particular adapter type or device type.

The computing system 102 may include one or more hardware based processors 104, also known as a central processing unit (CPU). Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

The processor 104 interfaces with an interconnect (or computer bus) 108. The computer bus 108 may be, for example, a system bus, a Peripheral Component Interconnect (PCI) bus (or PCI-Express (PCIe) bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other interconnect type.

An adapter interface 110 facilitates the ability of the computing system 102 to interface with the adapter 116 via the link 115. Link 115 may be an interconnect system, for example, a PCIe bus. The computing system 102 also includes other devices and interfaces 114, which may include a display device interface, a keyboard interface, a pointing device interface, etc. Details regarding the other devices 114 are not germane to the embodiments disclosed herein.

The computing system 102 may further include a storage device 112, which may be for example a hard disk, a CD-ROM, a non-volatile memory device (flash or memory stick) or any other mass storage device. Storage 112 may store operating system program files, application program files, and other files. Some of these files are stored on storage 112 using an installation program. For example, the processor 104 may execute computer-executable process steps of an installation program so that the processor 104 can properly execute the application program.

Memory 106 (may also be referred to as host memory 106) also interfaces to the computer bus 108 to provide the processor 104 with access to memory storage. Memory 106 may include random access main memory (RAM). When executing stored computer-executable process steps from storage 112, the processor 104 may store and execute the process steps out of RAM. Read only memory (ROM, not shown) may also be used to store invariant instruction sequences, such as start-up instruction sequences or basic input/output system (BIOS) sequences for operation of a keyboard (not shown).

With continued reference to FIG. 1A, link 115 and the adapter interface 110 couple the adapter 116 to the computing system 102. The adapter 116 may be configured to handle both network and storage traffic. Various network and storage protocols may be used to handle network and storage traffic, for example, Ethernet, Fibre Channel, iSCSI and others. The adaptive embodiments disclosed herein are not limited to any particular protocol, as long as the functional goals are met by an existing or new network protocol.

Adapter 116 interfaces with the computing system 102 via the link 115 and a host interface 118. In one embodiment, the host interface 118 may be a PCI Express interface having logic/circuitry for sending and receiving PCI-Express packets.

The adapter 116 may also include a processor 124 that executes firmware instructions out of an adapter memory 126 (may also be referred to as memory 126) to control overall adapter operations. The adapter 116 may also include local storage 128, which may be for example non-volatile memory, such as flash memory, or any other device. The storage 128 may store executable instructions and operating parameters that can be used for controlling adapter operations.

The adapter 116 includes a network module 120 for handling network traffic via a link 132. In one embodiment, the network module 120 includes logic and circuitry for handling network packets, for example, Ethernet or any other type of network packets. The network module 120 may include memory buffers (not shown) to temporarily store information received from other network devices 138 and transmitted to other network devices 138.

The adapter 116 may also include a storage module 122 for handling storage traffic to and from storage devices 136. The storage module 112 may further include memory buffers (not shown) to temporarily store information received from the storage devices 136 and transmitted by the adapter 116 to the storage devices 136. In one embodiment, the storage module 122 is configured to process storage traffic according to the Fibre Channel storage protocol, or any other protocol.

It is noteworthy that adapter 116 may only have a network module 120 or a storage module 122. The embodiments described herein are not limited to any particular adapter type.

The adapter 116 also includes a network interface 130 that interfaces with link 132 via one or more ports (not shown). The network interface 130 includes logic and circuitry to receive information via the network link 132 and pass it to either the network module 120 or the storage module 122, depending on the packet type.

Adapter 116 also includes a direct memory access (DMA) module 119 that is used to manage access to link 115. The DMA module 119 uses a plurality of DMA channels (not shown) for managing access to link 115. The DMA channels are typically used to move control structures such as input/output control blocks (IOCBs), input/output status blocks (IOSBs) and data between host system memory 106 and the adapter memory 126. An IOCB is a control block for writing or reading data. The IOCB specifies the operation type (i.e. read, write or request for status) provides an address from where data is to be read or written too; and may include a payload for writing the data and other fields.

Figure 1B:
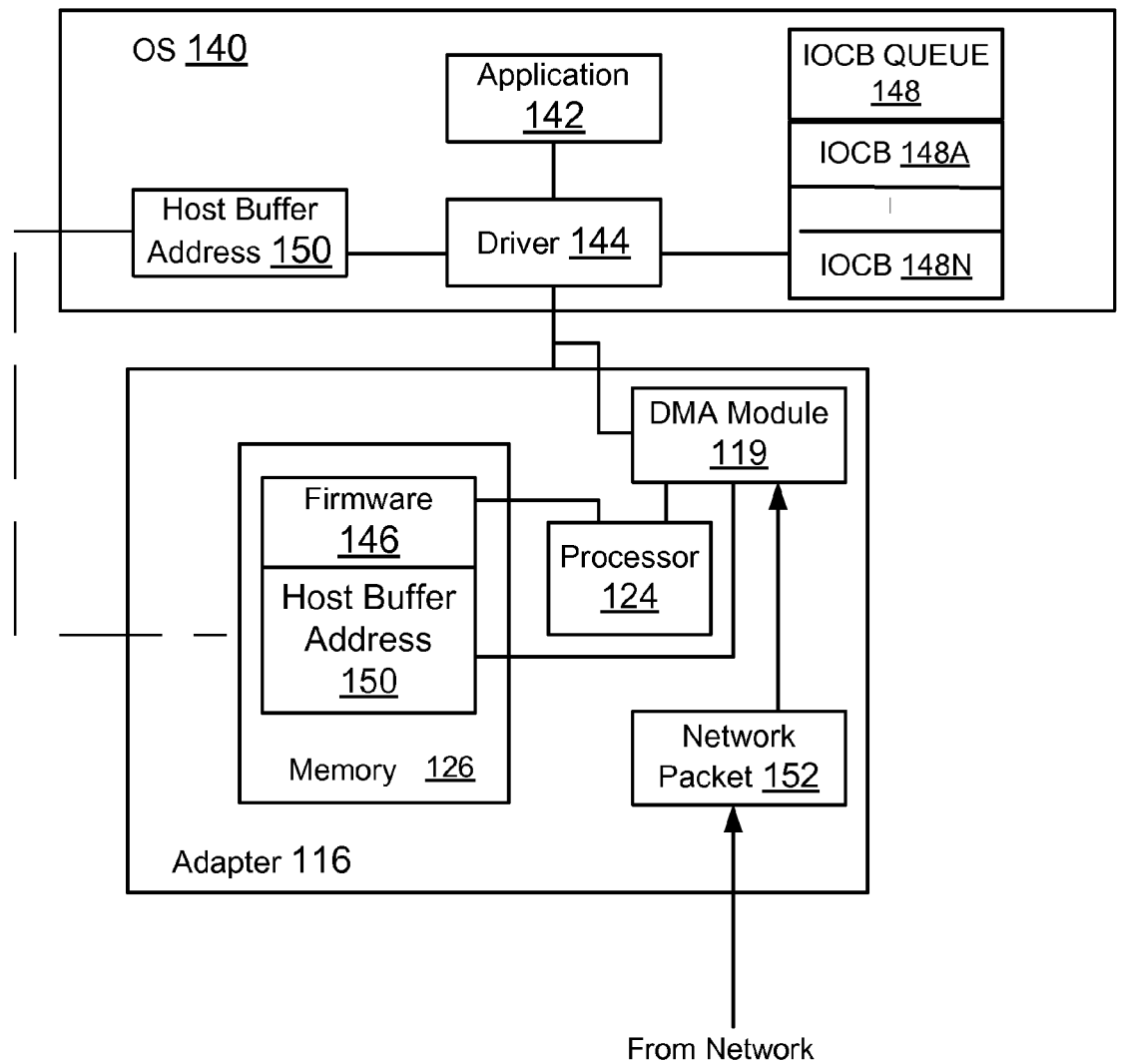
FIG. 1B shows a block diagram of a generic architecture used by the system of FIG. 1A.

FIG. 1B shows an example of a generic software architecture used by system 100. Processor 104 executes an operating system 140 for controlling the overall operations of computing system 102. The operating system may be Windows based, Linux operating system, Solaris, or any other operating system type. The embodiments disclosed herein are not limited to any particular operating system type.

An application 142 may be executed by processor 104 for performing certain functions. For example, application 142 may be an email program, a database application or any other application type. Application 142 may send a command to a driver 144 for performing an operation, for example, reading and/or writing data (input/output (I/O) at another storage device. The driver 144 processes the request and communicates with firmware 146 executed by processor 124 of adapter 116. A component of adapter 116 then processes the request.

Typically for managing data transfers across link 115, the following process steps are typically used: an IOCB is first generated by the driver 144 and saved at an IOCB queue 148, shown as 148A-148N. The IOCB queue 148 may be at host memory 106 or any other location. The IOCB is obtained by adapter 116 which may be to provide data to host processor 104 or to send data provided by host processor 104. Both IOCB fetch and data transfer operations are performed using DMA operations via DMA channels. Based on the IOCB, adapter 116 executes the operations that may be needed. Adapter 116 then uses DMA operation to send a status block (IOSB) to processor 104 indicating the completion of IOCB execution and associated data transfer.

In one embodiment, driver 144 (or any other host system module) posts a host buffer address 150 at a host memory location. The DMA engine 119 obtains the host buffer address 150 via link 115. The host buffer address is DMAed into adapter memory 126.

When a packet is received by adapter 116 for application 142 or any other host system module, then processor 124 executing firmware instructions, generates a request for DMA engine 119 to obtain the host buffer address 150 from memory 126. The DMA engine 119 obtains the host buffer address and then transfers the network packet to host memory using the host buffer address. Processor 124 does not have to read the host buffer address. In another aspect, the processor 124 may provide the entire IOCB to the DMA engine 119 for processing.

In conventional systems, processor 124 has to read the host buffer address from adapter memory and then build a DMA request and provide the DMA request to the DMA engine 119. The proposed solution in this disclosure offloads that task to the DMA engine 119 so that the processor 124 can be used to perform other tasks.

Figure 2:
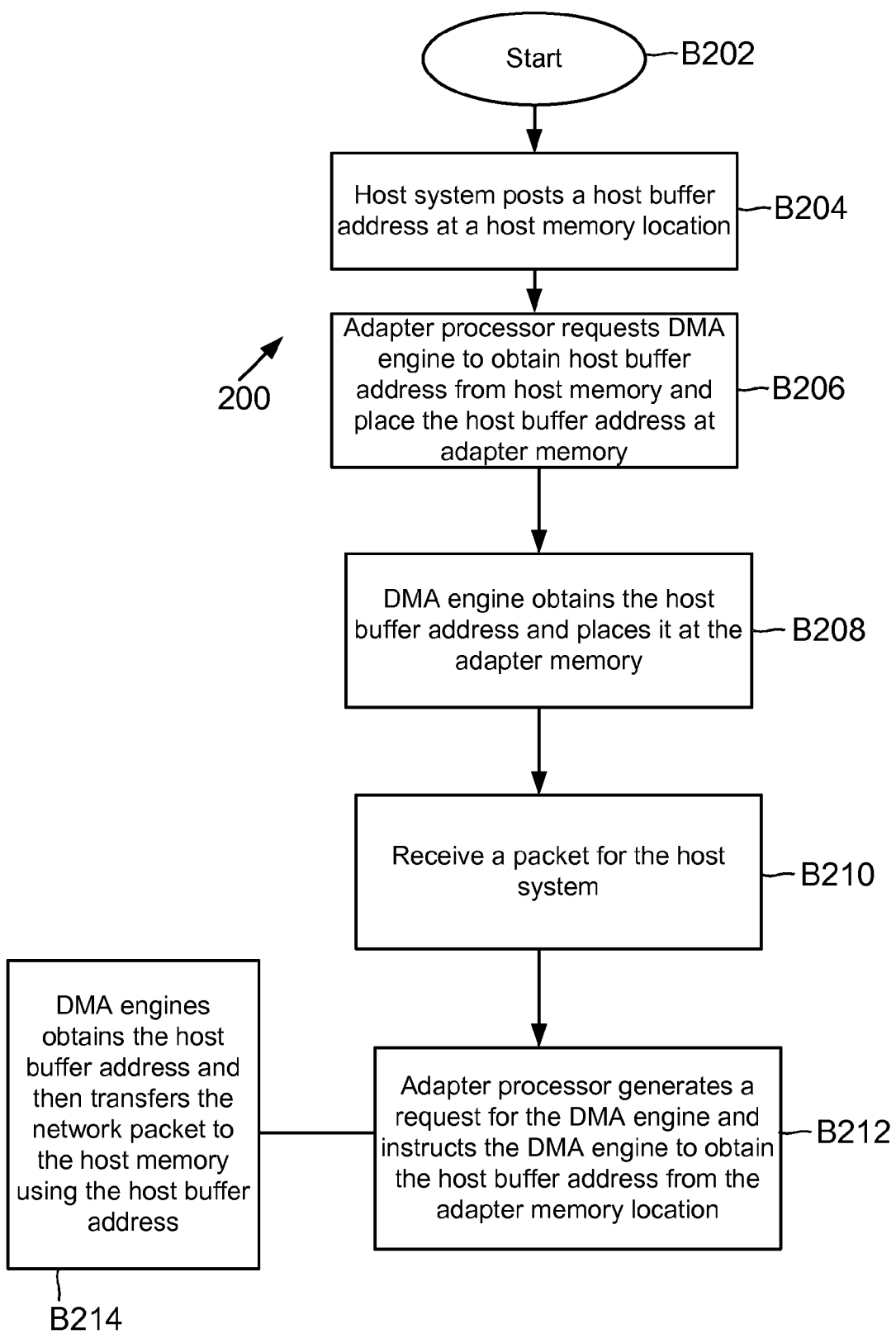
FIG. 2 shows a process for executing DMA operations, according to one embodiment.

FIG. 2 shows a process 200 for using the DMA techniques described herein. The process 200 begins in block B202 when host system 102 is initialized and operational. Adapter 116 is also operational and ready to send and receive data. In block B204, the host system 102 (or driver 144) posts the host buffer address 150 at host memory 106. Driver 144 notifies the adapter 116 that the host buffer address 150 has been posted. As described above, the host buffer address 150 is provided to the adapter 116 so that the adapter 116 can DMA data to the host memory address.

In block B206, the adapter 116 requests the DMA engine 119 to obtain the host buffer address from host memory 106 and then place the host buffer address at the adapter memory 126. In block B208, the DMA engine executes the request, obtains the host buffer address and stores it at the adapter memory 126.

In block B210, the adapter receives a packet for host system 102. The packet is pre-processed and validated. In block B212, the adapter processor 124 instead of reading and obtaining the host buffer address, instructs the DMA engine 119 to obtain the host buffer address from adapter memory 126. In another aspect, the adapter processor 124 may provide an IOCB to the DMA engine 119 for processing. In block B214, the DMA engine 119 obtains the host buffer address and then transfers the packet via link to the host memory 106.

In one embodiment, the processor 124 does not have to perform an address read and then generate a DMA request. Instead the DMA engine performs the host buffer address read operation and executes the DMA request. This better utilizes the adapter 116 resources.

The above description presents the best mode contemplated for carrying out the present embodiments, and of the manner and process of making and using them, in such full, clear, concise, and exact terms as to enable any person skilled in the art to which they pertain to make and use these embodiments. These embodiments are, however, susceptible to modifications and alternate constructions from that discussed above that are fully equivalent. For example, the embodiments disclosed herein are applicable to any peripheral device and are not limited to any particular adapter type. Consequently, these embodiments are not limited to the particular embodiments disclosed. On the contrary, these embodiments cover all modifications and alternate constructions coming within the spirit and scope of the embodiments as generally expressed by the following claims, which particularly point out and distinctly claim the subject matter of the embodiments.

What is claimed is:

1. A machine implemented method, comprising:

posting a host memory address at a computing device memory by a device driver executed by the computing device that interfaces with a device configured to receive data from a network; wherein the host memory address provides a location of the computing device memory for the device for placing received network data;

notifying the device coupled to the computing device by the device driver that the host memory address is posted at the computing device memory;

instructing a direct memory access (DMA) engine of the device by a device processor to retrieve the host memory address from the computing device memory;

retrieving the host memory address from the computing device memory by the DMA engine and storing the host memory address at a device memory located at the device by the DMA engine;

receiving a packet at the device for the computing device;

in response to receiving the packet, instructing the DMA engine by the device processor to retrieve the host memory address from the device memory for placing the packet to the location of the computing device memory;

retrieving the host memory address from the device memory by the DMA engine without the device processor having to read the host memory address from the device memory; and transferring the packet by the DMA engine using a DMA operation to the location of the computing device memory identified by the host memory address read by the DMA engine from the device memory.

2. The method of claim 1, wherein the device is coupled to the computing device using a peripheral bus.

3. The method of claim 1, wherein the device is a host bus adapter.

4. The method of claim 1, wherein the device is a converged network adapter.

5. The method of claim 1, wherein the device is a network interface card.

6. The method of claim 1, wherein the device is coupled to the computing device via a PCI-Express link.

7. A non-transitory, machine readable storage medium having stored thereon instructions for performing a method, comprising machine executable code which when executed by at least one machine, causes the machine to:

post a host memory address at a computing device memory by a device driver executed by the computing device that interfaces with a device configured to receive data from a network; wherein the host memory address provides a location of the computing device memory for the device for placing received network data;

notify the device coupled to the computing device by the device driver that the host memory address is posted at the computing device memory;

instruct a direct memory access (DMA) engine of the device by a device processor to retrieve the host memory address from the computing device memory;

retrieve the host memory address from the computing device memory by the DMA engine and storing the host memory address at a device memory located at the device by the DMA engine;

receive a packet at the device for the computing device;

in response to the received packet, instruct the DMA engine by the device processor to retrieve the host memory address from the device memory for placing the packet to the location of the computing device memory;

retrieve the host memory address from the device memory by the DMA engine without the device processor having to read the host memory address from the device memory; and transferring the packet by the DMA engine using a DMA operation to the location of the computing device memory identified by the host memory address read by the DMA engine from the device memory.

8. The non-transitory, storage medium of claim 7, wherein the device is coupled to the computing device using a peripheral bus.

9. The non-transitory, storage medium of claim 7, wherein the device is a host bus adapter.

10. The non-transitory, storage medium of claim 7, wherein the device is a converged network adapter.

11. The non-transitory, storage medium of claim 7, wherein the device is a network interface card.

12. The non-transitory, storage medium of claim 7, wherein the device is coupled to the computing device via a PCI-Express link.

13. A system, comprising:
a computing device coupled to a device having a device processor and a direct memory access (DMA) engine; wherein the device is configured to receive data from a network;
wherein a device driver executed by the computing device posts a host memory address at a computing device memory and notifies the device that the host memory address is posted at the computing device memory, where the host memory address provides a location for placing by the device received network data at the computing device memory; wherein the device processor instructs the DMA engine to retrieve the host memory address from the computing device memory and the DMA engine retrieves the host memory address from the computing device memory without the device processor accessing the host memory address and stores the host memory address at a device memory located at the device; and
wherein when the device receives a packet for the computing device, the device processor instructs the DMA engine to retrieve the host memory address from the device memory; the DMA engine retrieves the host memory address without the device processor having to read the host memory address; and then transfers the packet by a DMA operation to the location of the computing device memory identified by the host memory address read by the DMA engine from the device memory.

14. The system of claim 13, wherein the device is coupled to the computing device using a peripheral bus.

15. The system of claim 13, wherein the device is a host bus adapter or a converged network adapter.

16. The system of claim 13, wherein the device is a network interface card.

17. The system of claim 13, wherein the device is coupled to the computing device via a PCI-Express link.

* * * * *